June 2, 1959  J. CSAPO  2,889,388
PRODUCTION OF DRY-CHARGED BATTERY PLATES
Filed Aug. 9, 1955
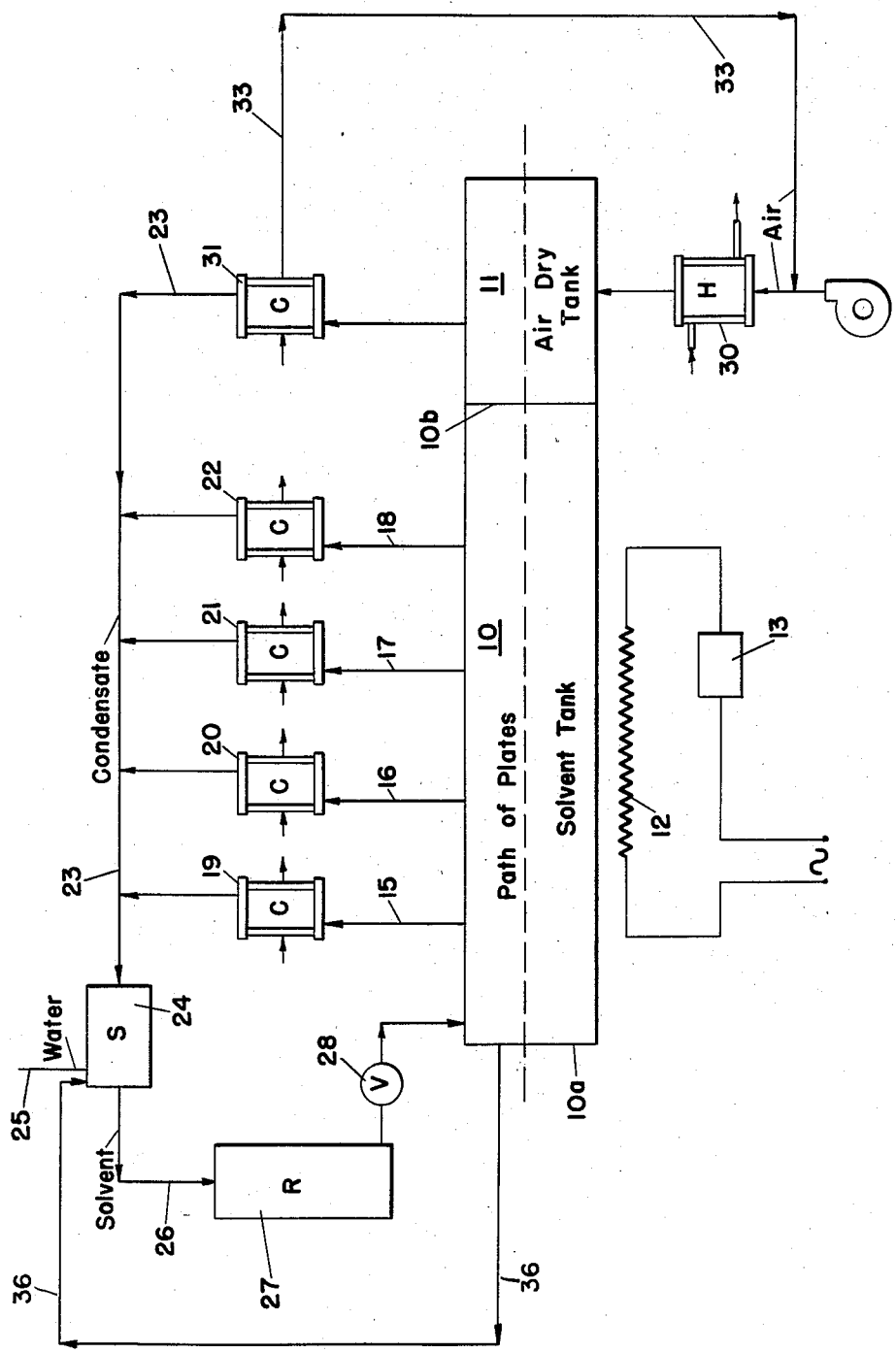

United States Patent Office 2,889,388
Patented June 2, 1959

2,889,388

PRODUCTION OF DRY-CHARGED BATTERY PLATES

John Csapo, Emmaus, Pa., assignor to The Electric Storage Battery Company, a corporation of New Jersey Application August 9, 1955, Serial No. 527,218

6 Claims. (Cl. 136—33)

This invention relates to the production of dry-charged negative plates and has for an object the removal of moisture therefrom in order to minimize oxidation thereof.

The present invention is particularly applicable to negative plates of pure sponge lead of the type used in lead/acid storage batteries. Such negative plates tend rapidly to lose their charge by oxidation of the pure sponge lead with resultant loss of charge which would otherwise be present at the time of addition of electrolyte.

In the past, numerous suggestions have been made as to how to minimize the oxidation of the pure sponge lead, such for example, as flushing the plates with acetone and alcohol, and other similar liquids miscible with water.

In accordance with the present invention, the charged negative plates of pure sponge lead are immersed in a liquid comprising perchlorethylene. Moisture in the plates will immediately move into the treating liquid, which is itself immiscible with water. Preferably the treating liquid is maintained at a temperature sufficient for vaporization of the water. The plates are maintained in the hot bath for a time adequate for egress therefrom of all moisture within the plates. Thereafter the plates are removed from the bath and the treating liquid evaporated therefrom. The bath itself performs a number of important functions. In the first place, the negative plates as they are heated are protected against contact with atmospheric oxygen. The heating of the plates is uniform throughout all external surfaces thereof. The surfaces of the plates are uniformly in contact with a dry heating agent in the sense that the liquid being immiscible with respect to water does not absorb it. Accordingly, as the temperature of the plate rises, moisture present, due to the gradually rising temperature, moves outwardly of the plate and into the liquid. The moisture, then in vapor form in mixture with vapors of perchlorethylene, leaves the liquid. Little, if any, of the moisture is absorbed or dissolved therein. The plates need be heated only to temperatures at which the moisture will vaporize. Due to the presence of the vapors of the treating agent, the temperature will be below the boiling point of water, i.e., in the range upwardly from about 190° F. The immersion need only be adequate for the migration and forced removal of the moisture from the innermost regions of the plate outwardly into the bath from whence it vaporizes.

It has been found that dry-charged negative storage battery plates may be produced in accordance with the present invention with lead oxide present in amounts ranging below around 6%, in contrast with negative plates which are dried in air and which may contain lead oxide in amounts upwardly of 25%.

In the preferred form of the invention, I prefer to utilize perchlorethylene, also known as tetrachloroethylene, as the heating and treating liquid for the reason that it is immiscible with water. It has a boiling point somewhat greater than that of water, namely, about 121° C. The perchlorethylene is non-inflammable; it does not react with the active material, i.e., pure sponge lead; and it is relatively volatile in the sense that when the plates are removed from the hot bath, they can be dried in air. For reasons of solvent recovery, however, it is preferred that they be dried as part of a recovery system.

A further unexpected advantage of the present invention is the fact that plates treated with perchlorethylene in the manner described above are moisture-proof. Treated plates dipped in water appear perfectly dry on removal therefrom. On the other hand, when a coining pressure is applied to an area of the plate sufficient to produce metallic lead, as by movement of a blunt tool across it, moisture will adhere to the metallized area, but the remainder of the plate will continue to be moisture-free and moisture will not adhere thereto. The exact mechanism by which this result is accomplished is not thoroughly understood at this time. It appears likely that a protective film may remain on the porous structure, the film being moisture-proof — at least, highly moisture resistant. This appears logical inasmuch as perchlorethylene is immiscible with water in any case. A less likely theory is that the film remaining on the active material by reason of occlusion of air maintains a moisture-proof surface.

For further objects and advantages of the invention and for a more detailed description of the manner of practicing it, reference is to be had to the following description taken in conjunction with the accompanying drawing in which there has been schematically illustrated a system by means of which the present invention may be practiced.

In the drawing, there have been omitted conventional accessories, such for example, as a continuous conveyor which will extend from one end of the system to the other, and the transfer valves by means of which the treating zone may be sealed from the atmosphere and different sections thereof sealed from other sections. The negative plates, after charging thereof and conversion of the lead into substantially pure sponge lead, move in succession into the treating zone 10 containing sufficient perchlorethylene to insure complete immersion of the plates as they are moved from the entrance 10a to the exit from the tank 10b for transfer into the drying zone 11.

The tank or treating zone 10 may be heated by any suitable means, as for example, a heating element 12 shown in the form of a heating resistor energized from any suitable source of supply and under the control of a conventional controller 13 which maintains the temperature of the bath somewhat above the vaporizing temperature of water. The length of the treating zone 10 relative to the speed of movement of the plates therethrough is such that the plates will remain immersed in the hot bath for a time interval sufficient thoroughly to dry the plates and for removal of all or substantially all moisture therefrom. The heating time will depend on the temperature of the bath and the thickness of the plates; it will be less than five minutes for thin plates, such as used in automotive batteries, and will be greater for plates of greater thickness. The heating time will to lesser degree be affected by the length and breadth of the plates.

It is preferred that moisture be continuously withdrawn from the heating zone 10 as through a plurality of flow paths provided by the outlet lines 15—18, each leading to condensers 19—22, each supplied with a cooling medium for condensation of the immiscible solvent, perchlorethylene, and the water vapor removed from the plates. The mixture flows into a vessel 24. Because the water is immiscible in the perchlorethylene, the water may be removed through the upper outlet line 25, and the perchlorethylene flows by way of outlet line 26 into a storage tank 27 from which it is fed under the control of a valve 28 into the treating zone 10 to maintain a relatively constant level therein. Moisture can also be removed in the liquid phase as indicated by the conduit 36 leading to the separator or vessel 24.

The plates, after removal of moisture by passage through the zone 10, are transferred into the drying zone 11. To hasten the drying, air is raised in temperature by the heat exchanger 30 and after circulation about the plates within the drying zone 11 passes through a condenser 31. The vapors of the perchlorethylene form a condensate stream which flows by way of the return line 23 to the separator 24. Air may be withdrawn from the condenser 31 and recycled as indicated by the return line 33.

While the practice of the method may be satisfactorily performed in the manner described, it is to be understood that many variations in the process will occur to those skilled in the art without departure from the spirit and scope of the appended claims. In summary perchlorethylene is the preferred treating liquid since it is non-inflammable, does not hydrolyze in contact with water, is immiscible with water, has a boiling point above the vaporization temperature of water, and neither adversely effects the pure sponge lead nor produces disadvantageous or deleterious products upon addition of the electrolyte to the battery.

Plates, a term used as generic to battery electrodes, treated with perchlorethylene in the manner described above are moisture-proof and by reason of exclusion of moisture from the plate, increase the resistance to oxidation not only during the so-called dry-charging process but also during subsequent storage of such plates.

What is claimed is:

1. In the production of dry-charged negative battery plates of substantially pure sponge lead, the method of preventing oxidation of the sponge lead during the drying of the plates, which comprises immersing the plates having a substantial moisture content into perchlorethylene, heating said perchlorethylene to maintain its temperature above the vaporization temperature of water, after immersion of said plates in said perchlorethylene for a time adequate for removal of substantially all moisture from the plates removing the plates therefrom, and drying said plates by evaporating perchlorethylene therefrom whereby a residue of said perchlorethylene is provided upon said plates.

2. In the production of dry-charged battery plates, the steps comprising immersing the plates in a treating zone having a liquid bath of perchlorethylene at a temperature above the vaporization temperature of water, transporting the plates through said zone from an entrance point to an exit point to maintain them immersed in said perchlorethylene for a time adequate for removal of substantially all moisture therefrom, transferring the plates from said exit into a drying zone, and circulating air at elevated temperature about said plates to evaporate perchlorethylene therefrom whereby a residue of said perchlorethylene is provided upon said plates.

3. The method set forth in claim 2 in which moisture and vapors of said perchlorethylene in multiple flow paths distributed throughout said zone are cooled to form a condensate, and after separating the water from said perchlorethylene returning the latter to the treating zone.

4. The method of claim 3 in which said air at elevated temperature after contact with said plates is cooled to condense perchlorethylene removed from said plates, and recycling the air from said drying zone.

5. In the production of dry-charged negative battery plates of substantially pure sponge lead, the method of preventing oxidation of the sponge lead during the drying of the plates, which comprises immersing the plates having a substantial moisture content into perchlorethylene, heating said perchlorethylene to maintain its temperature above the vaporization temperature of water, after immersion of said plates in said perchlorethylene for a time adequate for removal of substantially all moisture from the plates removing the plates therefrom, and drying said plates by evaporating perchlorethylene therefrom, said plates having a residue of said perchlorethylene thereon rendering them water-proof and oxidation-resistant.

6. A dry-charged plate for a battery comprising substantially pure sponge metal, the particles of which are coated with a water-proof protective film consisting of the residue of perchlorethylene which remains after immersion of the plates in a hot bath of perchlorethylene and after substantial drying of said plates of perchlorethylene, said residue retarding oxidation of the sponge metal and being characterized by permeability to the electrolyte of the battery.

References Cited in the file of this patent

UNITED STATES PATENTS

| | | |
|---|---|---|
| 524,710 | Fitzgerald | Aug. 21, 1894 |
| 1,688,399 | Reinhardt | Oct. 23, 1928 |
| 1,718,139 | Grimditch | June 18, 1929 |
| 1,725,734 | Heap | Aug. 20, 1929 |
| 1,799,248 | Reinhardt | Apr. 7, 1931 |
| 2,452,983 | Birdseye | Nov. 2, 1948 |
| 2,677,713 | Weil et al. | May 4, 1954 |
| 2,715,151 | Gritman | Aug. 9, 1955 |
| 2,747,008 | Sundberg et al. | May 22, 1956 |

FOREIGN PATENTS

| | | |
|---|---|---|
| 201,750 | Germany | Aug. 1, 1907 |